(12) United States Patent
Kanchi et al.

(10) Patent No.: US 9,733,641 B2
(45) Date of Patent: Aug. 15, 2017

(54) METHOD AND APPARATUS FOR PERFORMING DIAGNOSTICS ON A CONVENTIONAL CONTROL VALVE

(71) Applicant: YOKOGAWA ELECTRIC CORPORATION, Musashino-shi, Tokyo (JP)

(72) Inventors: Lakshmi Kiran Kanchi, Singapore (SG); Sankar Selvaraj, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 948 days.

(21) Appl. No.: 14/060,100

(22) Filed: Oct. 22, 2013

(65) Prior Publication Data

US 2015/0112639 A1    Apr. 23, 2015

(51) Int. Cl.
*G05B 23/02* (2006.01)
(52) U.S. Cl.
CPC ................. *G05B 23/0235* (2013.01)
(58) Field of Classification Search
CPC ............................................. G05B 23/0235
USPC ............... 702/100, 113, 150, 179, 182, 183; 318/560; 700/81
See application file for complete search history.

(56) References Cited

U.S. PATENT DOCUMENTS

| | | | | |
|---|---|---|---|---|
| 6,573,679 B1 * | 6/2003 | Villaret | ............... | G05B 19/19 318/560 |
| 2009/0248180 A1 * | 10/2009 | Hagglund | ............ | G05B 19/404 700/81 |

* cited by examiner

*Primary Examiner* — Gregory J Toatley
*Assistant Examiner* — Felix Suarez
(74) *Attorney, Agent, or Firm* — Westerman, Hattori, Daniels & Adrian, LLP (57) ABSTRACT

The method comprises obtaining data samples, each data sample comprising a process variable and a controller output for adjusting the process variable to reach a set-point variable; and determining if there is valve jump or stiction by calculating a jump index or a static band index; wherein calculating the jump index comprises calculating a mean of a first set of angles, each angle from the first set of angles being computed from a ratio of: a difference between a peak process variable and its preceding process variable, and, a difference between a controller output corresponding to the peak process variable and its preceding controller output; and wherein calculating the static band index comprises calculating a mean of a second set of angles, each angle of the second set of angles being computed from a difference between a controller output corresponding to a flat process variable and its preceding controller output.

15 Claims, 6 Drawing Sheets

METHOD AND APPARATUS FOR PERFORMING DIAGNOSTICS ON A CONVENTIONAL CONTROL VALVE

TECHNICAL FIELD

The present invention relates generally to performing diagnostics on a conventional control valve in a process plant, and in particular to determining valve stiction.

BACKGROUND

Conventional control valves in process plants do not have smart positioners or other self-provided feedback mechanisms for allowing a user to tell how well such valves are performing. However, this also means that the cost of conventional control valves is low compared to smart valves. Thus, usage of conventional valves can be expected to account for the majority of valves used in process plants.

Figure 1:
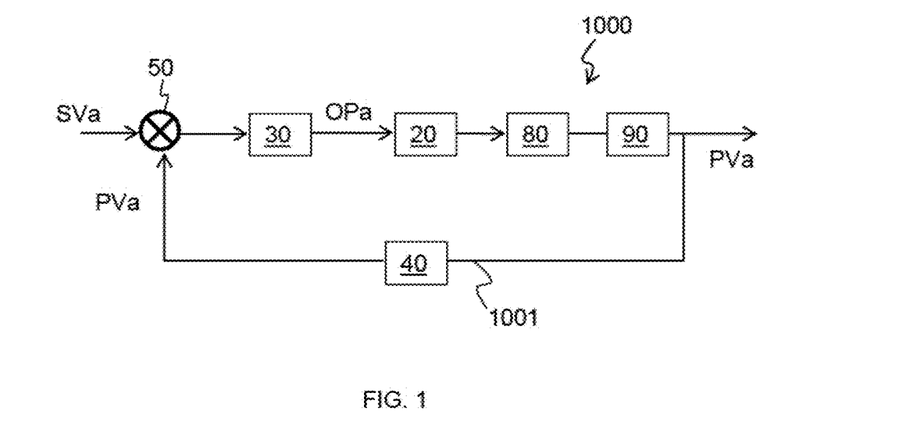
FIG. 1 is a schematic illustration of an auto mode control system for a conventional control valve in a process plant.
Figure 2:
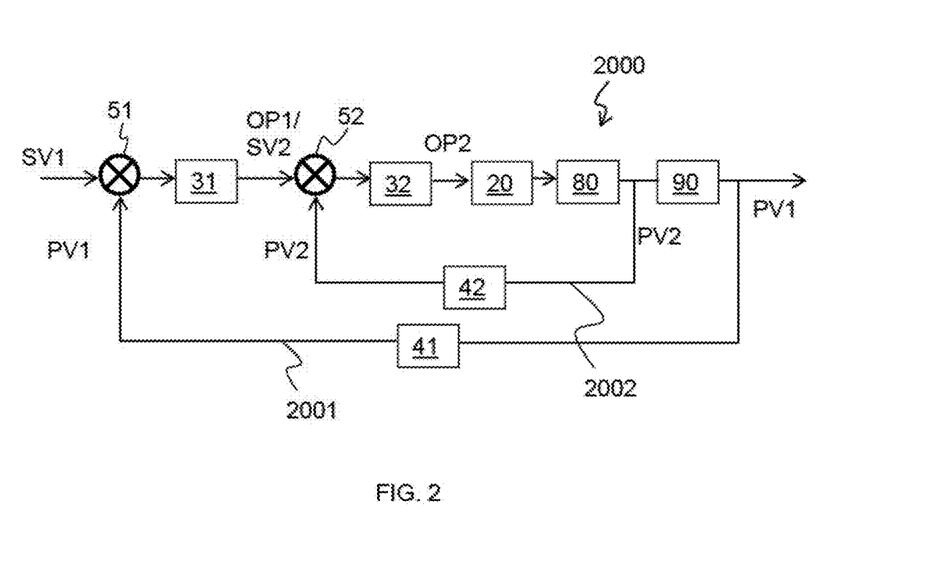
FIG. 2 is a schematic illustration of a cascade mode control system for a conventional control valve in a process plant.

It is known that a conventional control valve may be controlled using a single loop (auto mode) control system as shown in FIG. 1 or a multiple loop (cascade mode) control system as shown in FIG. 2. The auto mode control system 1000, as shown in FIG. 1, typically comprises only one control loop 1001 which controls a conventional control valve 20 that regulates fluid flow to a number of processes 80, 90. The valve 20 is controlled by a controller 30 that sends a controller output (OPa) to the valve 20. A measurable process output (commonly referred to as a process variable (PVa)) is obtained after all the processes 80, 90 using a measurement sensor/transmitter 40 provided in the control loop 1001. A desired process output (commonly referred to as a set-point variable (SVa), a constant) is fed into a summing junction 50 provided in the control loop 1001. PVa is also fed into the summing junction 50 such that the difference of SVa−PVa is input to the controller 30 from the summing junction 50. The controller output OPa which is input to the valve 20 is thus a function of both SVa and PVa. Ultimately, the purpose of the control loop 10 is to have the PVa reach a steady state that is as close to the SVa as possible.

The cascade mode control system 2000, as shown in FIG. 2, typically comprises a number of control loops 2001, 2002 which together control a conventional control valve 20 that similarly regulates fluid flow to a number of processes 80, 90 in the process plant 2. This valve 20 is typically controlled using a primary controller 31 as well as a secondary controller 32. Where more control loops are used, the number of controllers correspondingly increases.

In the first control loop 2001, a first measurable process output or process variable (PV1) is obtained after all the processes 80, 90 using a first measurement sensor/transmitter 41 provided in the first control loop 2001. PV1 is fed into a summing junction 51. A final desired process output or set-point variable (SV1, a constant) is also fed into the first summing junction 51 such that the difference of SV1−PV1 is input to the primary controller 31 from the first summing junction 51. Output (OP1) of the primary controller 31 is thus affected by both SV1 and PV1.

In the second control loop 2002, a second measurable process output or process variable (PV2) is obtained after only one process 80 using a second measurement sensor/transmitter 42 provided in the second control loop 2002. PV2 is fed into a second summing junction 52. OP1 from the primary controller 31 is also fed into the second summing junction 52 such that the difference of OP1−PV2 is input to the secondary controller 32 from the second summing junction 52. From the secondary controller 31, a controller output (OP2) is sent directly to the valve 20. OP1 thus serves as a set-point variable (SV2) for the secondary controller 32 such that OP2 of the secondary controller 32 is affected by both OP1 and PV2. The secondary loop 2002 in a cascade mode control system 2000 thus serves to fine tune the controller input OP2 that is received by the valve 20. Ultimately, the purpose of the cascade control system 2000 is to have PV1 reach a steady state that is as close to SV1 as possible.

Understandably, unchecked and undetected deterioration in a conventional control valve can have significant impact on process control, and in extreme cases, may lead to unscheduled plant shutdown. As usage of conventional control valves in process plants worldwide will continue to be high, a reliable online/offline diagnostics tool using live/stored data for such conventional control valves will be valuable in enabling early detection of valve related problems while being a non-intrusive method that does not require plant shutdown.

At present, currently available valve diagnostics systems are only applicable to auto mode control systems as they rely on the assumption that the set-point variable that is input to the controller through the summing junction is a constant. Thus, cascade mode control loops have to be artificially set as auto mode control loops in order to use currently available valve diagnostics systems. However, this gives rise to questionable accuracy of diagnostics results for cascade mode control systems because the secondary controller of a cascade mode control system does not receive a constant set-point variable input but instead receives a variable input of OP1 from the primary controller 31.

Figure 3:
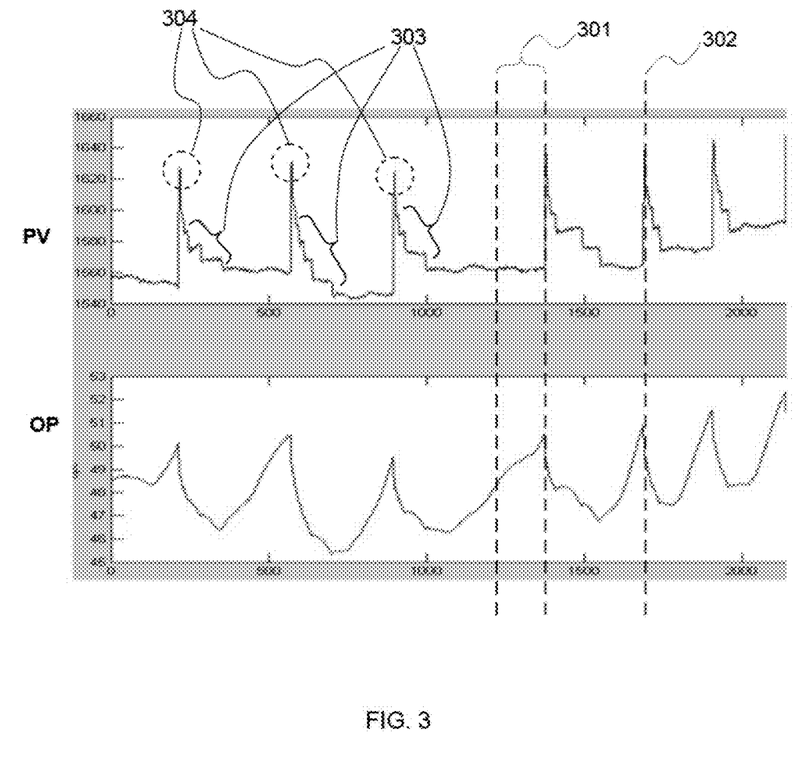
FIG. 3 is a graph of PV and OP showing valve stiction and valve jump.

In particular, stiction is a problem that currently available valve diagnostics systems has not been able to determine adequately for conventional control valves that are controlled in a cascade mode control system due to the variable input set-point variable received by the secondary controller. Stiction is a valve problem where the valve does not increase its flow rate despite increasing controller output OP to the valve to do so. Stiction results in the measurable process variable PV remaining relatively unchanged over a period of increasing controller output OP to the valve, this period being commonly known as the stiction band 301 as shown in FIG. 3. In this situation, the controller continues to increase its output OP in an attempt to raise the unchanging PV. Within the valve stiction there is another problem of valve jump where the valve eventually responds when the controller output OP reaches a certain value, resulting in a sudden jump 302 in the measurable process variable PV that far exceeds that which is normally expected with the input OP value. This jump typically overshoots the desired set-point variable SV for the process. When a jump occurs, the controller reacts with a sharp drop in its output OP which results in the PV correspondingly falling. To avoid the PV dropping too much below the desired SV, the controller again increases its OP, but stiction of the valve again results in the valve not correspondingly increasing flow rate until valve jump occurs where the OP reaches a certain value at which the valve finally responds with another jump in the PV beyond the desired SV. Valve stiction thus results in the PV remaining unchanged for periods of time between sudden jumps or spikes in PV about the desired SV, instead of maintaining a steady state PV at or close to the desired SV.

SUMMARY

According to a first aspect, there is provided a method of performing diagnostics on a conventional control valve in a process plant, the valve being associated with a process in the process plant and the valve being controlled by a controller, the method comprising: a processor obtaining data samples from a database stored on a server of the process plant, each data sample comprising a process variable value and a controller output value, the process variable value being a detected value of a process variable obtained from the process, and the controller output value being a value sent from the controller to the valve for adjusting the process variable to reach a set-point variable, the set-point variable being a desired value for the process variable; and the processor determining if there is at least one of: valve jump and valve stiction by calculating at least one of a jump index and a static band index from the data samples respectively; wherein calculating the jump index comprises calculating a mean of a first set of angles, each angle from the first set of angles being computed from a ratio of: a difference between a peak process variable value and its preceding process variable value, and, a difference between a controller output value corresponding to the peak process variable value and its preceding controller output value, such that a jump index greater than or equal to a predetermined jump index value is indicative of valve jump; and wherein calculating the static band index comprises calculating a mean of a second set of angles, each angle of the second set of angles being computed from a difference between a controller output value corresponding to a flat process variable value and its preceding controller output value, such that a static band index greater than or equal to a predetermined static band index value is indicative of valve stiction.

The method may further comprise finding the peak process value prior to calculating the jump index, the peak process variable value being each process variable value that has been found for each sudden rise in process variable value obtained from the process, and wherein finding each peak process variable value comprises: calculating a process variable difference between successive process variable values from the data samples obtained from the database; calculating a process variable angle from the process variable difference; and finding each peak data sample wherein the process variable angle is greater than a threshold value and wherein a ratio of the process variable difference to a maximum process variable value is greater than a preset ratio, each peak data sample comprising a peak process variable value and its corresponding controller output value.

Finding each peak data sample may further comprise selecting peak data samples at a sampling interval.

The method may further comprise finding the flat process variable value prior to calculating the static band index, the flat process variable value being each process variable value that has been found to be not significantly changing with time, and wherein finding each flat process variable value comprises: calculating a process variable difference between successive process variable values from the data samples obtained from the database; and finding each flat data sample wherein a ratio of the process variable difference to a maximum process variable value is less than a prearranged ratio, each flat data sample comprising a flat process variable value and its corresponding controller output value.

Finding each flat data sample may further comprise selecting flat data samples at a sampling interval.

The method may further comprise the processor determining which control mode that control of the valve is in, the control mode being one of: an auto control mode and a cascade control mode.

The method may further comprise the processor determining if there is at least one of: valve jam, valve saturation and valve hunting prior to determining if there is at least one of: valve jump and valve stiction.

The set-point variable may be a constant when control of the valve is in an auto control mode, or the set-point variable may be a variable controller output sent from a further controller when control of the valve is in a cascade control mode.

According to a second aspect, there is provided an apparatus for performing diagnostics on a conventional control valve in a process plant, the apparatus comprising: a process associated with the valve; a controller configured to control the valve; a database stored on a server; and a processor, the processor having a data pre-treatment module configured to obtain data samples from the database, each data sample comprising a process variable value and a controller output value, the process variable value being a detected value obtained from the process and the controller output value being a value sent from the controller to the valve for adjusting the process variable to reach a set-point variable, the set-point variable being a desired value for the process variable; the processor further having a diagnostics module configured to calculate at least one of: a jump index and a static band index from the data samples to determine if there is at least one of: valve jump and valve stiction; the jump index comprising a mean of a first set of angles, each angle from the first set of angles being computed from a ratio of: a difference between a peak process variable value and its preceding process variable value, and, a difference between a controller output value corresponding to the peak process variable value and its preceding controller output value, such that a jump index greater than or equal to a predetermined jump index value is indicative of valve jump; the static band index comprising a mean of a second set of angles, each angle of the second set of angles being computed from a difference between a controller output value corresponding to a flat process variable value and its preceding controller output value, such that a static band index greater than or equal to a predetermined static band index value is indicative of valve stiction.

The peak process variable value may be each process variable value that has been found for each sudden rise in process variable value obtained from the process, and the diagnostics module may be further configured to calculate a process variable difference between successive process variable values from the data samples obtained from the database; to calculate a process variable angle from the process variable difference; and to find each peak data sample wherein the process variable angle is greater than a threshold value and wherein a ratio of the process variable difference to a maximum process variable value is greater than a preset ratio, each peak data sample comprising a peak process variable value and its corresponding controller output value.

The diagnostics module may be further configured to select peak data samples at a sampling interval.

The flat process variable value may be each process variable value that has been found to be not significantly changing with time, and the diagnostics module may be further configured to calculate a process variable difference between successive process variable values from the data samples obtained from the database; and to find each flat data sample wherein a ratio of the process variable difference to a maximum process variable value is less than a prearranged ratio, each flat data sample comprising a flat process variable value and its corresponding controller output value.

The diagnostics module may be further configured to select flat data samples at a sampling interval.

The processor may be further configured to determine which control mode that control of the valve is in prior to the processor determining if there is at least one of: valve jump and valve stiction, the control mode being one of: an auto control mode wherein the set-point variable is a constant value and a cascade control mode wherein the set-point variable is a variable controller output sent from a further controller provided in the cascade control mode.

The processor may be further configured to determine if there is at least one of: valve jam, valve saturation and valve hunting.

BRIEF DESCRIPTION OF THE FIGURES

Preferred embodiments of the apparatus and method will now be described with reference to the accompanying figures in which.

DETAILED DESCRIPTION OF THE PREFERRED EMBODIMENTS

Exemplary embodiments of a method 100 and apparatus 200 for performing diagnostics on a conventional control valve 20 in a process plant 2 will now be described with reference to FIGS. 1 to 7

Figure 4:
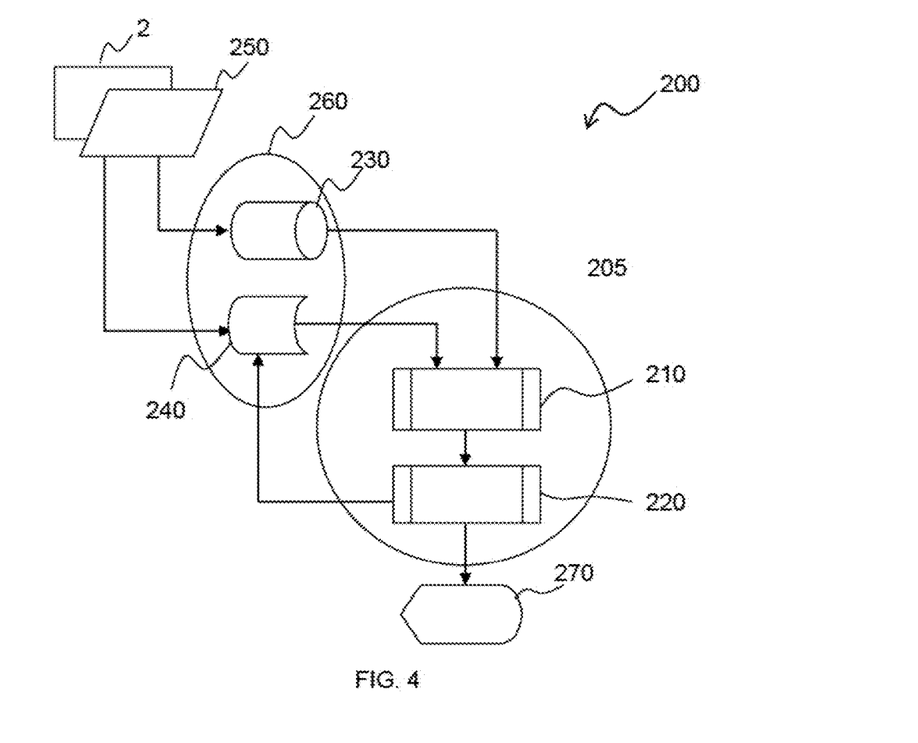
FIG. 4 is an architectural diagram of an exemplary apparatus for performing diagnostics on the conventional control valve of FIG. 1 and/or FIG. 2.
Figure 5:
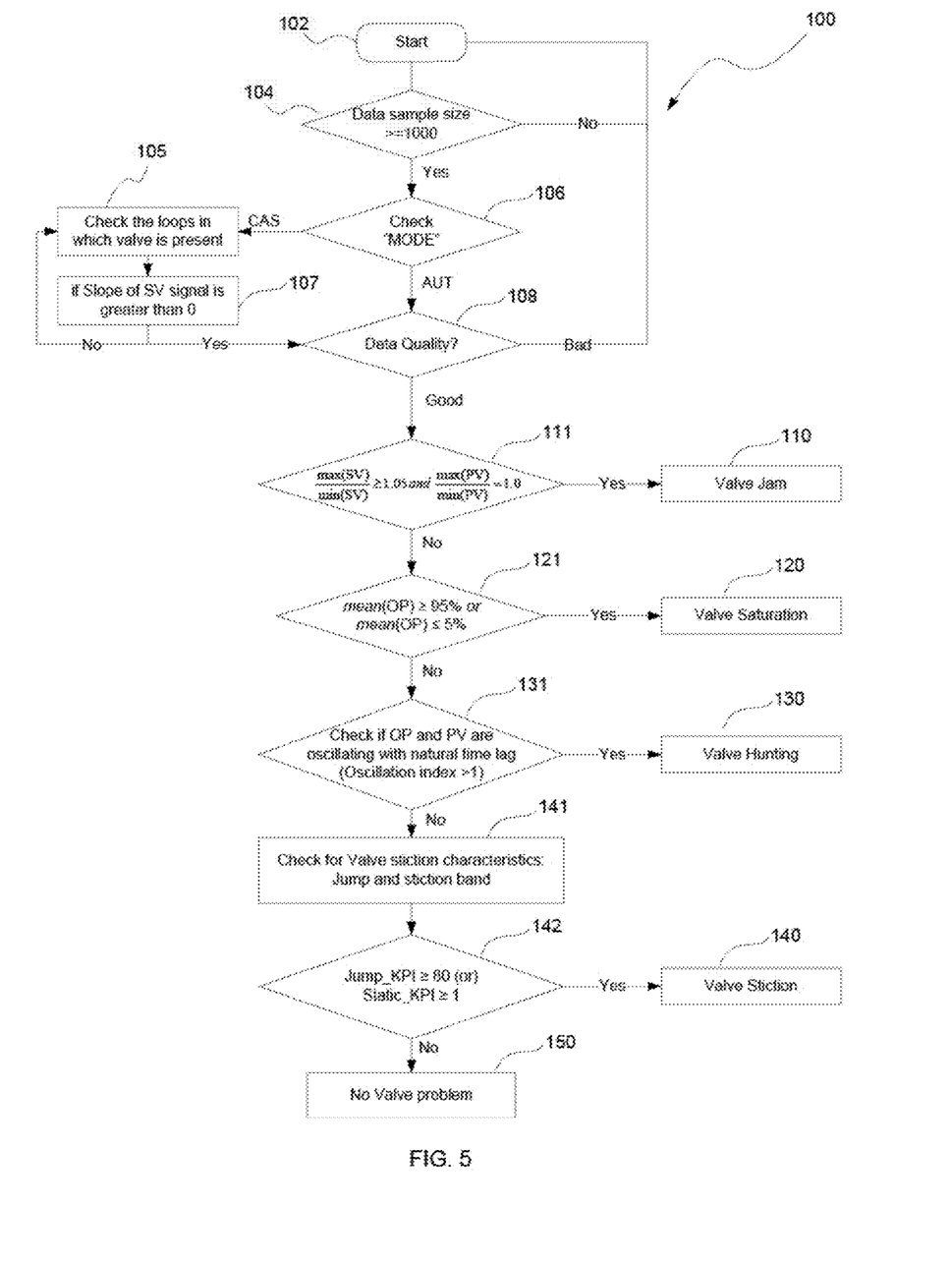
FIG. 5 is a flow chart of an exemplary method of performing diagnostics on the conventional control valve of FIG. 1 and/or FIG. 2.

As shown in FIG. 4, the apparatus 200 for performing diagnostics on the valve 20 controlled using either the auto mode control system 1000 (FIG. 1) or the cascade mode control system 2000 (FIG. 2) described above comprises a processor 205 having a data pre-treatment module 210 and a diagnostics module 220. At the start 102 of the method 100 as shown in FIG. 5, data samples from a database 230, 240 are obtained by the processor 205. Data in the database 230, 240 is input from process loop data 250 obtained during operation of the process plant 2. The database 230, 240 is preferably stored on a server 260. In a preferred embodiment, the database 230 is a real-time database 230 when it is desired to perform online diagnostics on the valve. Alternatively, the database 240 may be a historical or offline database 240 for performing offline diagnostics on the valve 20.

Obtaining data samples may be performed by the processor 205 at an online sampling frequency ranging from seconds to five minutes. Preferably, sampling frequency is less than or equal to 1 minute. When it is determined that the data sample size has reached a preset number 104, for example 1000 data samples, the collected data samples are fed into the data pre-treatment module 210 which is configured to filter the data samples prior to processing of the data by the diagnostics module 220 by checking if data quality is good 108. Filtering the data samples may include filtering for noise, checking the obtained data samples for inconsistency, mode constraints and other issues. Ideally, only good quality data should be used for processing by the diagnostics module 220.

As it is envisaged that the method 100 and apparatus 200 may be used for data obtained when the control system is in either auto mode 1000 or cascade mode 2000, the diagnostics module 220 of the processor 205 is preferably configured to check the control system mode 106, that is, whether it is in auto mode 1000 or cascade mode 2000 before checking of data quality 108 by the data pre-treatment module 210. When in cascade mode, the method 100 may be configured to proceed only when it is confirmed that the data samples are those obtained from a secondary control loop 1002 (FIG. 2). This may be determined by first determining the control loops in which the valve 20 is present 105, and then checking if the slope of the SV signal is greater than 0, 107 for each loop in which the valve 20 is present. A control loop in which the slope of the SV signal is greater than 0 indicates that the SV that is input to the summing junction is not a constant (as would be the case for the primary controller 31) but is a varying SV2 received by a second summing junction 52 in the form of a varying OP1 output from the primary controller 31), thereby indicating that the control loop is a secondary control loop 2002 in a cascade mode 2000.

Each data sample obtained from the database 230, 240 comprises at least a process variable (PV) measured from the process, a set-point variable (SV) that is a desired value for the PV and a controller output (OP) output to the valve 20 at a given point in time. For an auto mode control system 1000, the collected PV, SV and OP values would be PVa, SVa and OPa respectively as described above with reference to FIG. 1. For a secondary loop 2002 in a cascade mode control system 2000, the collected PV, SV and OP values would be PV2, SV2 (same as OP1) and OP2 respectively as described above with reference to FIG. 2.

Before determining if there is valve stiction, the method 100 may be configured to determine if there are other valve problems such as valve jam 110, valve saturation 120 and valve hunting 130.

Valve jam 110 occurs when the valve 20 does not respond to changes in OP such that there is no change in PV when there is a change in SV. Determining valve jam 111 may comprise the diagnostics module 220 processing the data samples to check if both conditions, of 1) ratio of maximum SV to minimum SV being greater than 1.05; and 2) ratio of maximum PV to minimum PV equal to 1, are satisfied. If both conditions are satisfied, it can be concluded that valve jam 110 has occurred.

Valve saturation 120 occurs when the valve 20 is continually at an extreme position, e.g., fully open or fully close. If it is found that valve jam 110 has not occurred, the method 100 may be further configured to determine if there is valve saturation 120. Determining valve saturation 121 may comprise the diagnostics module 220 processing the data samples to check if the mean OP is either 95% and above or 5% and below. If the mean OP indeed is either 95% and above or 5% and below, it can be concluded that there is a problem of valve saturation 120.

Valve hunting 130 occurs when the valve 20 overreacts to a change in input OP such that the PV increases too much when there is only a slight increase in OP and decreases too much when there is only a slight decrease in OP. This leads to a steady state PV matching the SV being unable to be continually maintained due to excessive movement of the valve, resulting in premature wear of the valve's mechanical parts. If it is found that there is no valve saturation, the method 100 may be further configured to determine if there is valve hunting 130. Determining valve hunting 131 may comprise the diagnostics module 220 processing the data samples to check if OP and PV are oscillating with a natural time lag. If the oscillation index is greater than 1, it can be concluded that there is a problem of valve hunting 130.

Figure 6:
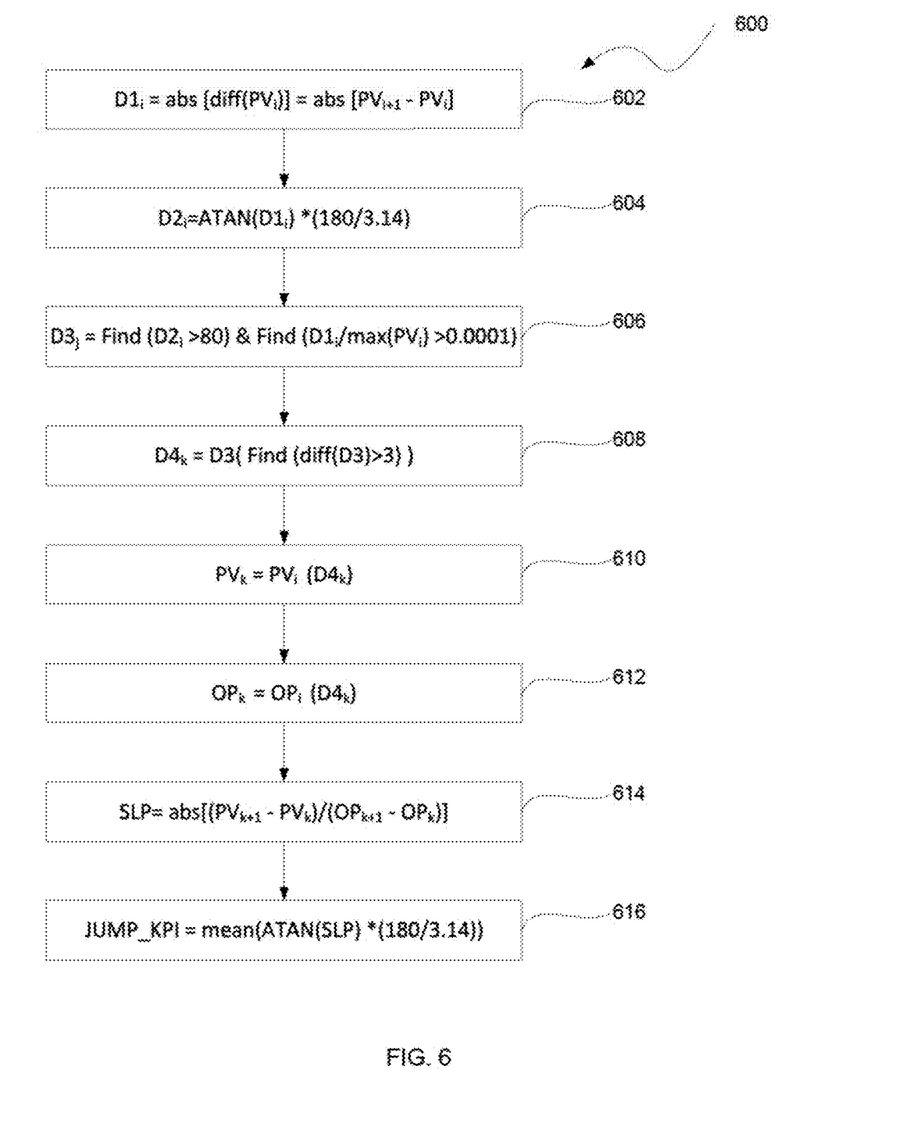
FIG. 6 is a flow chart of an exemplary method of determining a jump index.
Figure 7:
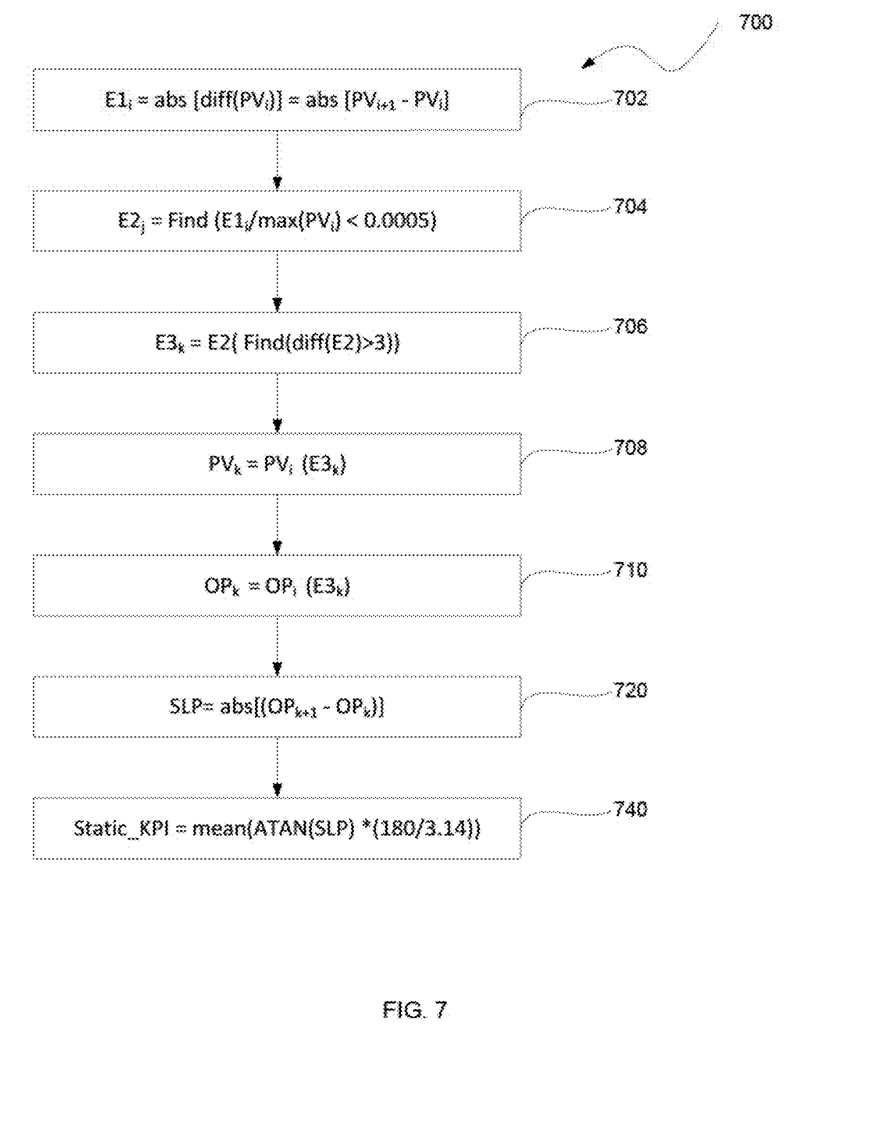
FIG. 7 is a flow chart of an exemplary method of determining a static band index.

In order to determine if there is valve stiction 140, the diagnostics module 220 is configured to check the collected data samples for valve stiction characteristics 141 by calculating a jump index (Jump_KPI) 600 as shown in FIG. 6 and a stiction band index (Static_KPI) 700 as shown in FIG. 7 for the collected data samples. If the jump index is calculated to be 80 or greater, or if the stiction band index is calculated to be 1 or greater, it can be concluded that there is a problem of valve stiction 140. If not, it can be concluded that there is no valve problem.

Calculating the jump index 600 as shown in FIG. 6 comprises creating a data set D1 that comprises each process variable difference between successive PV values 602 obtained from the collected data samples. D1 may be given by equation (1) below:

$$D1_i = abs[diff(PV_i)] = abs[PV_{i+1} - PV_i] \quad (1)$$

where i=1 to n (n being the sample size, e.g. 1000)

Subsequently, another data set D2 is created that comprises a process variable angle computed from each process variable difference in the first data set D1, 604. D2 may be given by equation (2) below:

$$D2_i = A\ TAN(D1_i) * (180/3.14) \quad (2)$$

A further data set D3 is created that comprises only those data samples where the PV value has been determined to be those associated with a sudden rise in PV 606. Determining the data samples where a sudden rise in PV has occurred may be performed by finding peak data samples where the process variable angle D2 of the change in PV values is greater than a threshold degree indicative of a steep rise in PV, for example 80 degrees, and where the ratio of the process variable difference D1 in PV values to the maximum PV value collected among all the data samples is greater than a preset ratio, for example 0.0001. Meeting such a ratio ensures that the specific data sample was indeed obtained when a sudden rise in PV value had occurred (as confirmed by the slope being greater than 80) and that the data samples in D3 are associated with each sudden rise in PV values (as confirmed by the ratio of D1 to max PV being greater than 0.0001). D3 may thus be given by equation (3) below:

$$D3_j = Find(D2_i > 80)\ \&\ Find(D1_i/max(PV_i) > 0.0001) \quad (3)$$

As illustrated with exemplary values shown in Table 1 below, the data set of D3 comprising $D3_j$ data values is created where j=1 to m, with m being the number of samples which satisfy the condition in equation (3). However, it is noted that the data set of D3 includes sub-peaks 303 associated with each actual peak 304 where a sudden rise in PV has occurred, as shown in FIG. 3.

TABLE 1

|  | i = 1 | i = 3 | i = 7 | i = 11 |
|---|---|---|---|---|
| $D3_j$ | $D3_1$ | $D3_2$ | $D3_3$ | $D3_4$ |
| D3 | $PV_1$ | $PV_3$ | $PV_7$ | $PV_{11}$ |

TABLE 1-continued

|  | i = 1 | i = 3 | i = 7 | i = 11 |
|---|---|---|---|---|
| Diff in i | 1st value, not subject to equation (4) | 2 - does not satisfy equation (4) | 4 - satisfies equation (4) | 11 - satisfies equation (4) |
| $D4_k$ | $D4_1$ | — | $D4_2$ | $D4_3$ |
| D4 | $PV_1$ |  | $PV_7$ | $PV_{11}$ |

In order to discount or eliminate these sub-peaks 303, yet another data set D4 may be created to comprise only those data samples that correspond with each distinct peak PV in each sudden rise in PV values, 608. D4 may be obtained by selecting data samples from the data set D3 at a sampling interval, such as every 4th sample, so that the sampling interval is greater than 3 samples, as given by equation (4) below:

$$D4_k = D3(Find(diff(D3) > 3)) \quad (4)$$

Thus, the dataset D4 is created such that D4=difference between "i" of successive values of $D3_j$ in the data set D3, where the difference in "i" is greater than 3, so that the data set D4 contains every $x^{th}$ data value in the dataset in D3, with x not less than 3. As illustrated with the row given in bold in Table 1 above:

(a) Difference between (i of j=2) and (i of j=1)=3−1=2, PV & OP of (i=3) is not in D4.
(b) Difference between (i of j=3) and (i of j=2)=7−3=4, PV & OP of (i=7) is in D4.

The data set D4 thus contains data values $D4_k$, where k=1 to p, with p being the number of samples which satisfy the condition in equation (4). In this way, sub-peaks near 304 may be eliminated from consideration and it may be concluded that all the PV values in the data set D4 are the peak PV values where a sudden rise in PV has occurred. The data samples from which these peak PV values are obtained may thus be concluded to be those data samples corresponding to sudden rises in PV values, $PV_k$, 610. Accordingly, OP values $OP_k$ corresponding to peak PV values $PV_k$ may be obtained from the data samples in the data set D4, 612.

It should be noted that a sudden rise in PV value may not indicate a valve jump problem if this was properly in response to a sudden rise in OP. Valve jump can only be concluded if the sudden rise in PV occurred without a similar sudden rise in input OP to the valve. Thus, for valve jump to be reliably determined, a ratio SLP_jump is first calculated 614, wherein SLP_jump is a ratio of: the difference between a peak process variable value $PV_{k+1}$ and its preceding process variable value $PV_k$, and the difference between a controller output value $OP_{k+1}$ corresponding to the peak process variable $PV_{k+1}$ value and its preceding controller output value $OP_k$, as given by equation (5) below:

$$SLP\_jump = abs[(PV_{k+1} - PV_k)/(OP_{k+1} - OP_k)] \quad (5)$$

The jump index Jump_KPI is then calculated 616, comprising a mean of a first set of angles, each angle of the first set of angles being computed from the SLP_jump as given by equation (6) below:

$$Jump\_KPI = mean(A\ TAN(SLP\_jump) * (180/3.14)) \quad (6)$$

If the jump index Jump_KPI is found to be greater than or equal to a predetermined jump index value indicative of a steep rise in PV, for example 80 degrees or greater, 142, it can be concluded that there is a valve jump problem, thereby confirming valve stiction 140.

Calculating the stiction band index 700 as shown in FIG. 7 comprises creating a data set E1 that comprises each process variable difference between successive PV values 702 obtained from the collected data samples. E1 may be given by equation (10) below:

$$E1_i = \text{diff}(PV_i) = PV_{i+1} - PV_i \quad (10)$$

where i=1 to n (n being the sample size, e.g. 1000)

Subsequently, a data set E2 is created that comprises only flat data samples where the PV value has been determined to be those where no significant change in PV with time has occurred 704. Determining the data samples where no significant change in PV with time has occurred may be performed by finding flat data samples where the ratio of the process variable difference E1 in PV values to the maximum PV value collected among all the data samples is smaller than a prearranged ratio, for example 0.0005. E2 may thus be given by equation (20) below:

$$E2_i = \text{Find}(E1_i / \max(PV_i) < 0.0005) \quad (20)$$

In order to eliminate or discount flat data samples which are too near/recent to each other, a further data set E3 may be created. E3 may be obtained by selecting E2 values at a sampling interval, such as every $4^{th}$ sample, so that the sampling interval is greater than 3 samples, as given by equation (30) below:

$$E3_k = E2(\text{Find}(\text{diff}(E2) > 3)) \quad (30)$$

It may be concluded that all the PV values in the data set E3 are the flat PV values where no significant change in PV has occurred over a minimum sampling interval. The flat data samples from which these flat PV values are obtained may thus be concluded to be flat data samples corresponding to those without significant change in PV values, $PV_k$, 708. Accordingly, OP values $OP_k$ corresponding to flat PV values $PV_k$ may be obtained from the flat data samples in the data set E3, 710.

It should be noted that a flat PV value, i.e., a PV value that is not significantly changing with time, may not indicate a valve stiction problem if this was properly in response to a flat OP value, i.e., an OP value that is also not significantly changing with time. Valve stiction can only be concluded if a flat PV plot against time was obtained while there was a significant change in input OP to the valve. Thus, for valve stiction to be reliably determined, a difference SLP_static needs to be calculated 720, wherein SLP_static is a difference between a controller output value $OP_{k+1}$ corresponding to a flat process variable value $PV_{k+1}$ and its preceding controller output value $OP_k$, as given by equation (40) below:

$$\text{SLP\_static} = \text{abs}[(OP_{k+1} - OP_k)] \quad (40)$$

The stiction band index Static_KPI 740 is then calculated from a mean of a second set of angles, each angle of the second set of angles being computed from the SLP_static, as given by equation (50) below:

$$\text{Static\_KPI} = \text{mean}(A\ \text{TAN}(\text{SLP\_static}) * (180/3.14)) \quad (50)$$

If it is found that the static band index Static_KPI is greater than or equal to a predetermined static band index, for example 1 or greater, 142, it can be concluded that there is a problem of valve stiction 140.

Results from the diagnostics module 220 are preferably displayed using appropriate hardware 270 in the apparatus 200 such as a display screen. The apparatus 200 may also be configured to alert the user of any valve problems, for example via email or using mobile telephone short messaging service (sms). Recording of the results may comprise storing the results in the database 240.

With the above method 100 and apparatus 200, performance data of the valve 20 is continually sampled, analyzed and reported, thereby allowing for real-time determining of stiction in the valve 20 to be achieved for both auto mode 1000 and cascade mode 2000 control loops despite the valve 20 being a conventional control valve 20 having no smart positioners or other self-provided feedback mechanisms. The present method 100 and apparatus 200 thus allow users to enjoy the benefits of using lower cost conventional control valves without worrying about undetected valve stiction adversely affecting process control and plant performance, and without having to install additional smart positioners on the conventional control valves to run valve diagnostics. Real-time reporting of the performance of the valve 20 also allows users to prepare for maintenance activities beforehand.

Where data is obtained from the offline database 240, the data samples may be manually imported by a user instead of automatically obtained by the processor 205, and processing of the data samples performed by the diagnostics module 220 may be performed remotely and offline instead of in real time.

Whilst there has been described in the foregoing description preferred embodiments of the present invention, it will be understood by those skilled in the technology concerned that many variations or modifications in details of design or construction may be made without departing from the present invention. For example, while the embodiment described above mention cascade mode control systems having only two control loops, the method and apparatus are equally applicable to cascade mode control loops having more than two control loops, e.g., the method and apparatus may be applied to a third controller in a third control loop in a cascade mode control system where the third controller receives as its set-point variable the controller output from the second controller.

The invention claimed is:

1. A method of performing diagnostics on a conventional control valve in a process plant, the method comprising:
   a processor obtaining data samples from a database stored on a server of the process plant, each data sample comprising a process variable value and a controller output value, the process variable value being a detected value of a process variable obtained from a process in the process plant associated with the valve being controlled by a controller, and the controller output value being a value sent from the controller to the valve for adjusting the process variable to reach a set-point variable, the set-point variable being a desired value for the process variable; and
   the processor determining if there is at least one of: a valve jump and a valve stiction by calculating at least one of a jump index and a static band index from the data samples respectively,
   wherein calculating the jump index comprises calculating a mean of a first set of angles, each angle from the first set of angles being computed from a ratio of: a difference between a peak process variable value and its preceding process variable value, and, a difference between a controller output value corresponding to the peak process variable value and its preceding controller output value, such that a jump index greater than or equal to a predetermined jump index value is indicative of the valve jump, and
   wherein calculating the static band index comprises calculating a mean of a second set of angles, each angle of the second set of angles being computed from a difference between a controller output value corresponding to a flat process variable value and its preceding controller output value, such that a static band index greater than or equal to a predetermined static band index value is indicative of the valve stiction.

2. The method of claim 1, further comprising finding the peak process value prior to calculating the jump index, the peak process variable value being each process variable value that has been found for each sudden rise in process variable value obtained from the process, and wherein finding each peak process variable value comprises:
calculating a process variable difference between successive process variable values from the data samples obtained from the database;
calculating a process variable angle from the process variable difference; and
finding each peak data sample wherein the process variable angle is greater than a threshold value and wherein a ratio of the process variable difference to a maximum process variable value is greater than a preset ratio, each peak data sample comprising a peak process variable value and its corresponding controller output value.

3. The method of claim 2, wherein finding each peak data sample further comprises selecting peak data samples at a sampling interval.

4. The method of claim 1, further comprising finding the flat process variable value prior to calculating the static band index, the flat process variable value being each process variable value that has been found to be not significantly changing with time, and wherein finding each flat process variable value comprises:
calculating a process variable difference between successive process variable values from the data samples obtained from the database; and
finding each flat data sample wherein a ratio of the process variable difference to a maximum process variable value is less than a prearranged ratio, each flat data sample comprising a flat process variable value and its corresponding controller output value.

5. The method of claim 4, wherein finding each flat data sample further comprises selecting flat data samples at a sampling interval.

6. The method of claim 1, further comprising the processor determining which control mode that control of the valve is in, the control mode being one of: an auto control mode and a cascade control mode.

7. The method of claim 1, further comprising the processor determining if there is at least one of: valve jam, valve saturation and valve hunting prior to determining if there is at least one of: the valve jump and the valve stiction.

8. The method of claim 1, wherein the set-point variable is a constant when control of the valve is in an auto control mode, and wherein the set-point variable is a variable controller output sent from a further controller when control of the valve is in a cascade control mode.

9. An apparatus for performing diagnostics on a conventional control valve in a process plant, the apparatus comprising:
a process associated with the valve;
a controller configured to control the valve;
a database stored on a server; and
a processor, the processor having a data pre-treatment module configured to obtain data samples from the database, each data sample comprising a process variable value and a controller output value, the process variable value being a detected value obtained from the process and the controller output value being a value sent from the controller to the valve for adjusting the process variable to reach a set-point variable, the set-point variable being a desired value for the process variable,
the processor further having a diagnostics module configured to calculate at least one of: a jump index and a static band index from the data samples to determine if there is at least one of: a valve jump and a valve stiction,
the jump index comprising a mean of a first set of angles, each angle from the first set of angles being computed from a ratio of: a difference between a peak process variable value and its preceding process variable value, and, a difference between a controller output value corresponding to the peak process variable value and its preceding controller output value, such that a jump index greater than or equal to a predetermined jump index value is indicative of the valve jump, and
the static band index comprising a mean of a second set of angles, each angle of the second set of angles being computed from a difference between a controller output value corresponding to a flat process variable value and its preceding controller output value, such that a static band index greater than or equal to a predetermined static band index value is indicative of the valve stiction.

10. The apparatus of claim 9, wherein the peak process variable value is each process variable value that has been found for each sudden rise in process variable value obtained from the process, and wherein the diagnostics module is further configured to calculate a process variable difference between successive process variable values from the data samples obtained from the database; to calculate a process variable angle from the process variable difference; and to find each peak data sample wherein the process variable angle is greater than a threshold value and wherein a ratio of the process variable difference to a maximum process variable value is greater than a preset ratio, each peak data sample comprising a peak process variable value and its corresponding controller output value.

11. The apparatus of claim 10, wherein the diagnostics module is further configured to select peak data samples at a sampling interval.

12. The apparatus of claim 9, wherein the flat process variable value is each process variable value that has been found to be not significantly changing with time, and wherein the diagnostics module is further configured to calculate a process variable difference between successive process variable values from the data samples obtained from the database; and to find each flat data sample wherein a ratio of the process variable difference to a maximum process variable value is less than a prearranged ratio, each flat data sample comprising a flat process variable value and its corresponding controller output value.

13. The apparatus of claim 12, wherein the diagnostics module is further configured to select flat data samples at a sampling interval.

14. The apparatus of claim 9, wherein the processor is further configured to determine which control mode that control of the valve is in prior to the processor determining if there is at least one of: the valve jump and the valve stiction, the control mode being one of: an auto control mode wherein the set-point variable is a constant value and a cascade control mode wherein the set-point variable is a variable controller output sent from a further controller provided in the cascade control mode.

15. The apparatus of claim 9, wherein the processor is further configured to determine if there is at least one of: a valve jam, a valve saturation, and a valve hunting.

\* \* \* \* \*